Figures 1, 6:
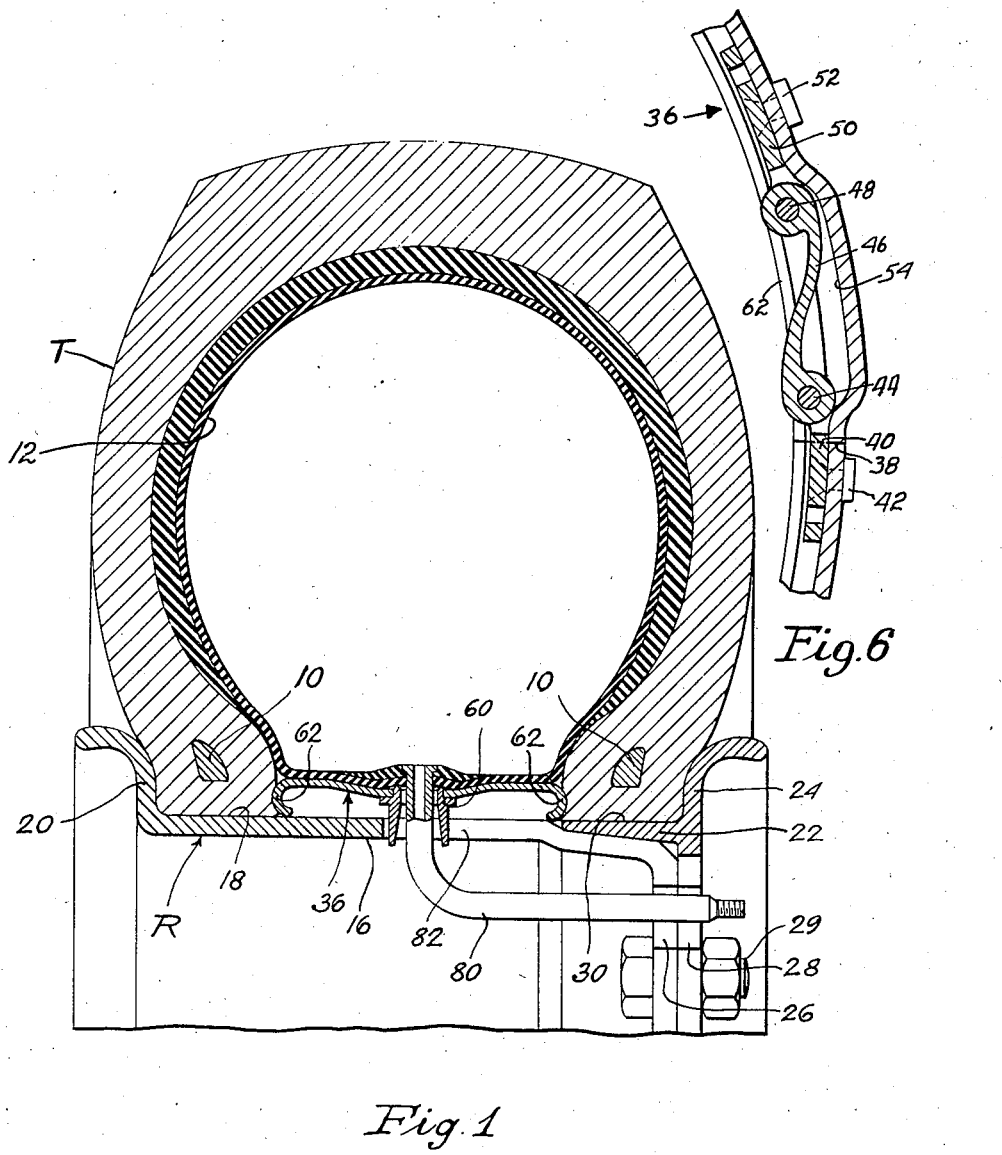

Aug. 28, 1945. C. E. ZARTH 2,383,577
METAL RING
Filed Sept. 2, 1942 2 Sheets-Sheet 1

Inventor
Charles E. Zarth

Aug. 28, 1945.   C. E. ZARTH   2,383,577
METAL RING
Filed Sept. 2, 1942   2 Sheets-Sheet 2
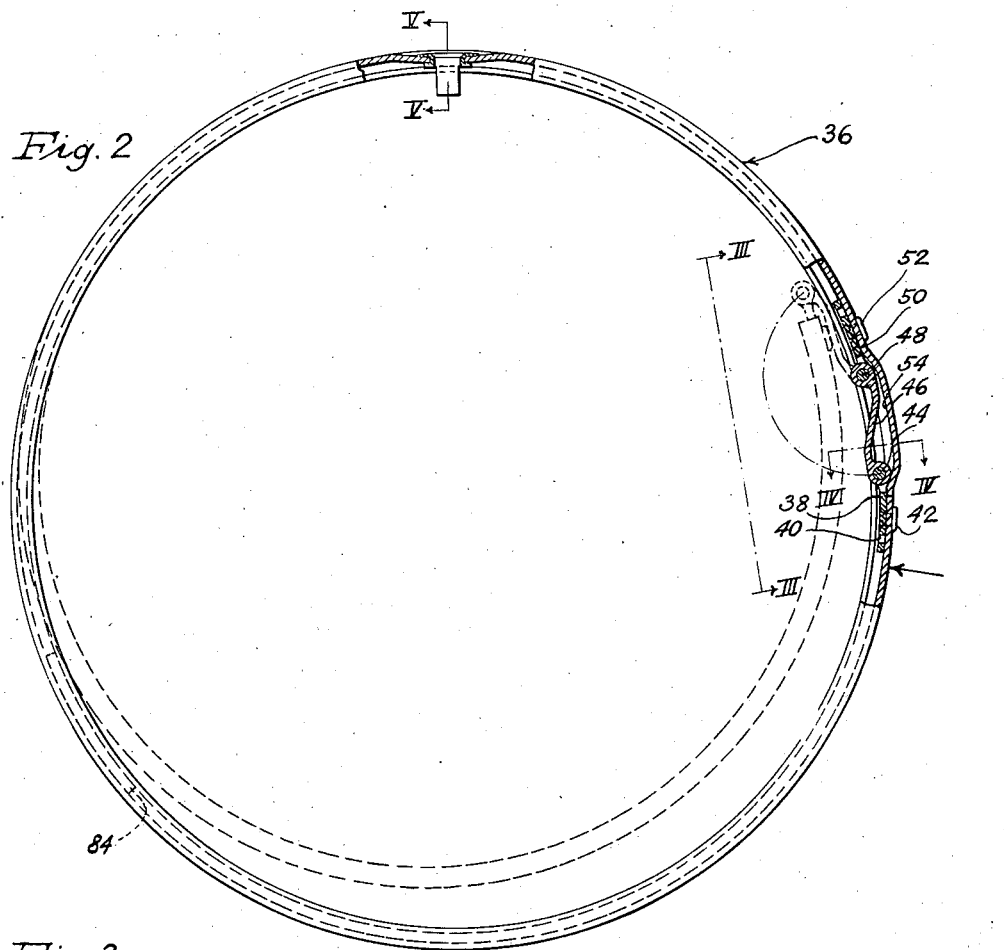
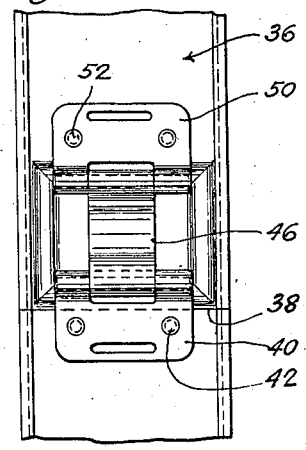
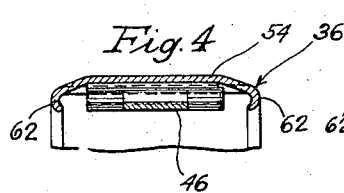
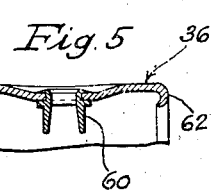
Inventor
Charles E. Zarth
Attorney Patented Aug. 28, 1945

2,383,577

UNITED STATES PATENT OFFICE 2,383,577

METAL RING

Charles E. Zarth, Akron, Ohio, assignor to Wingfoot Corporation, Akron, Ohio, a corporation of Delaware Application September 2, 1942, Serial No. 456,969

3 Claims. (Cl. 152—400)

This invention relates to a pneumatic tire and rim combination, and, more particularly, to expansible and contractible metal ring structures adapted to assist in locking an open-beaded straight-sided pneumatic tire on a rim.

The general object of my invention is the provision of mounting and locking means for a pneumatic tire so that there can be no relative movement between the mounting means and the tire in case of a blowout or loss of pressure in the tire.

Another object of my invention is to provide an improved, relatively inexpensive, strong, rugged, easily operated circular metal member of the expansible and contractible type.

Another object of my invention is the provision of an improved tire and rim combination.

Another object of my invention is to provide a one piece split metal ring, having its end portions connected together by link structure so that the ring can be snapped to either an expanded or a contracted position.

For a better understanding of my invention reference should be had to the accompanying drawings wherein Fig. 1 is a cross sectional view through a tire and rim assembly embodying my invention; Fig. 2 is a side elevation of one embodiment of the expansible and contractible metal ring of my invention and shown in the assembly of Fig. 1; Fig. 3 is an elevation of the hinge joint connecting the ends of the metal ring illustrated in Fig. 2; Fig. 4 is a cross sectional view taken on line IV—IV of Fig. 2; and Fig. 5 is a cross sectional view taken on line V—V of Fig. 2; Fig. 6 is an enlarged sectional view through the hinge plates.

In Fig. 1 of the drawings, the letter T indicates a pneumatic tire, usually of the open-beaded, straight-sided, rubber-lined type and including inextensible bead reinforcements 10. Received within the tire is an inner tube 12. The tire is mounted on a rim R, which may be of any of several types, but which has been illustrated as a divided rim including a base portion 16 terminating at one side in a bead seat 18 bounded by a side flange 20 which is usually made integral with the rim and which is adapted to engage with the side of one of the beads of the tire T. The base 16 of the rim R is adapted to slidably support an endless ring 22 having an integral side flange 24 thereon which is adapted to engage with the other bead of the tire. The base rim 16 and the flange ring 22 are provided, usually at a plurality of circumferentially spaced points, with radially inwardly extending lug portions 26 and 28 through which suitable clamping bolts 29 extend so that the flange 24 and flange ring 22 can be moved towards the flange 20 to clamp tightly against the outer sides of the beads of the tire T, as hereinafter more particularly described. It will be noted that the flange 24 and flange ring 22 form a bead seat 30 for the tire, and this bead seat is the same diameter as the bead seat 18 due to the slight offset in the base rim 16 which receives the ring 22.

Although I have illustrated and described my invention in conjunction with a divided rim, it should be particularly understood that I may employ other types of rims, for example, a flat based rim having a split side ring snapping into and locking in a well or gutter in the side of the flat base rim.

Positioned removably between the beads of the tire T is an expansible and contractible metal ring constructed in accordance with my invention and which has been indicated as a whole by the numeral 36. As best seen in Figs. 2 to 5 the metal ring 36 is generally made from a single piece of metal, such as steel, having its end portions so connected that the ring may be expanded and contracted. In the embodiment of my invention illustrated this is usually achieved by splitting the ring transversely at a point 38, after welding the ends together, although it will be understood that the split 38 may be provided by abutting the ends of the ring 36 during the rolling thereof without a welding and splitting operation. A hinge plate 40 is secured, for example by a rivet 42 adjacent the radially inner side of one end of the ring, and the hinge plate 40 is pivotally secured, as at 44, to a link 46 which is in turn pivotally secured, as at 48, to a hinge plate 50 fastened by suitable means, such as a rivet 52, to the radially inner surface of the other end of the ring 36 at a point some little distance from the split 38. In order to provide room for the link 46 the metal ring 36 is usually pressed radially outwardly to form a bulge or pocket 54, all as illustrated in Figs. 2, 3 and 4.

Conveniently, the hinge plate 40 extends beyond the split 38 so that the pivot point 44 lies beyond the split 38. This structure provides a shoulder or shelf on which the other end of the ring rests in abutting engagement with the hinge plate and the first-named end of the ring 36. Further, it will be seen that the pivot points 44 and 48 of the structure are substantially in the plane of the ring, and, therefore, the link 46 is made with oppositely offset ends, as shown, so that when the ring is collapsed and the link 46 lies in the dotted line position shown, the pivot points are connected by the link without straining or bending the link or striking the ends of the ring.

By the ring construction just described it is posible to move the ring from the expanded full line position shown in Fig. 2 to the contracted dotted line position shown in Fig. 2. This is achieved by pressing radially inwardly on the end of the ring below the split 38 (in the direction shown by the arrow in Fig. 2) so that the pivot point 44 swings through the dot and dash line shown and moves up to the dotted position as shown. The ring is then contracted and can be readily placed between or removed from between the beads of a pneumatic tire or wherever else it may be used. Of course, the ring is expanded from the collapsed position shown in dotted lines to the expanded full line position by reversing the operation. One of the interesting things about the ring 36 is that the spring or resiliency of the ring itself causes the ring to snap to and resiliently hold itself at either the collapsed or the expanded position, all of which makes the ring very convenient.

As seen in Figs. 2 and 5 the metal ring 36 is usually formed with an opening for a valve stem, and this opening usually comprises a suitable aperture in the center of the ring in which a metal grommet 60 is secured in the manner best seen in Fig. 5. The grommet 60 usually is made of sufficient length so that it extends into locating or driving relation with the valve stem opening in the rim base 16. The side edges of the metal ring 36 may be formed with radially inwardly turned side flanges 62 of substantially semi-circular cross section.

Returning now to Fig. 1 of the drawings, the ring 36 is positioned between the beads of the tire, and usually radially within the inextensible bead reinforcements 10, so that when the parts are assembled as shown and the bolts 29 are tightened the ring 36 engages tightly with the toes of the beads and forces the toes of the beads radially inwardly into engagement with the base of the rim parts. Also, the clamping action of the bolts 29 forces the beads of the tire tightly into engagement with the side flanges on the rim. Thus, the beads of the tire are tightly locked on the rim and there can be no relative movement of the tire and rim regardless of the loss of air pressure within the tire. Positioning the ring 36 between the beads of the tire is, of course, facilitated by collapsing the ring, moving it between the beads, and then expanding. The ring 36 is removed from within the tire by collapsing the ring.

When the ring 36 is used with a flat base rim the split side ring of the flat base rim is forced progressively into the gutter at the side of the flat base rim by suitable means, such as a C-clamp, whereby the beads of the tire T are firmly clamped against and locked by the ring 36 so that there can be no movement between the tire and rim upon deflation of the tire.

A valve stem 80 secured to the inner tube 12 extends through the grommet 60 in the metal ring 36, through a suitable slot or opening 82 in the base of the rim R and is usually bent through an angle of 90 degrees so that the valve stem will extend out laterally from beneath the rim to a point where it can be readily secured to a conduit or other means for inflating the inside of the tire. A counterweight 84 may be secured to the ring 36 to counterbalance the weight of the hinge.

From the foregoing it will be recognized that I have achieved the objects of my invention in providing an improved combination of pneumatic tire, rim mounting and bead locking means, and by the provision of a relatively simple, easily operated, but strong and durable expanding ring. No tire flap is required because of the smoothness of the outer periphery of the locking ring. The combination is readily assembled and taken apart by the ordinary workman in a minimum of time and without requiring special tools.

While in accordance with the Patent Statutes I have specifically illustrated and described my advance in the art, it should be particularly understood that I am not to be limited thereto or thereby, but that the scope of my invention is defined in the appended claims.

I claim:

1. An expansible and contractible metal ring comprising a ring body formed with a substantially transverse split, a link, means pivotally securing the link at one end to the radially inner side of the ring body adjacent one end of the split, and means pivotally securing the link at its other end to the radially inner side of the ring body on the other side of the split and at a point spaced substantially the length of the link from the split, said ring body having a radially outwardly pressed pocket receiving the link.

2. A one piece resilient collapsible metal ring having a transverse split therein, a hinge plate secured to the inside of one end of the ring and extending beyond the end to form a shelf on which the other end of the ring is supported against radially inward movement, a link pivotally secured to the hinge plate at the unsupported end thereof, and a second hinge plate secured to the inside of the other end of the ring at a point spaced from the split, said link being secured to the second hinge plate and lying against the radially inner side of the ring when the ends of the ring are abutted, the end of the ring carrying the first-named hinge plate being adapted to be moved radially inwardly against the resiliency of the ring and pivoting on the link and then movable outwardly against the inside of the other end of the ring at a point spaced substantially twice the length of the link from the other end of the ring, said link being slightly offset in opposite directions at opposite ends whereby the link will lie substantially flat and not strike the ends of the ring when in the last-named position.

3. A one piece collapsible metal ring having a transverse split therein, a hinge plate on the inside of one end of the ring extending beyond the end to form a shelf on which the other end of the ring is supported against radially inward movement, a link pivotally secured to the hinge plate at the unsupported end thereof, a second hinge means on the inside of the other end of the ring spaced from the split, said link being secured to the second hinge means, the link having oppositely directed ends, the end of the link adjacent the hinge plate being radially outwardly offset and the end of the link adjacent the hinge means being radially inwardly offset when the ring is in expanded position whereby the link will be substantially flat against the ring in either the expanded or collapsed position of the ring.

CHARLES E. ZARTH.